United States Patent
Utaka et al.

(10) Patent No.: US 8,659,201 B2
(45) Date of Patent: Feb. 25, 2014

(54) STATOR FOR ELECTRIC ROTATING MACHINE

(75) Inventors: Ryosuke Utaka, Takahama (JP); Atsushi Umeda, Okazaki (JP)

(73) Assignee: Denso Corporation, Kariya (JP)

( * ) Notice: Subject to any disclaimer, the term of this patent is extended or adjusted under 35 U.S.C. 154(b) by 418 days.

(21) Appl. No.: 13/077,007

(22) Filed: Mar. 31, 2011

(65) Prior Publication Data

US 2011/0241462 A1 Oct. 6, 2011

(30) Foreign Application Priority Data

Mar. 31, 2010 (JP) .................................. 2010-082864

(51) Int. Cl.
*H02K 3/28* (2006.01)

(52) U.S. Cl.
USPC ............................................ 310/201; 310/71

(58) Field of Classification Search
USPC .......................................... 310/71, 184, 201
See application file for complete search history.

(56) References Cited

U.S. PATENT DOCUMENTS

| | | | | |
|---|---|---|---|---|
| 2,407,935 | A * | 9/1946 | Perfetti et al. | 310/201 |
| 4,309,634 | A * | 1/1982 | Koroly et al. | 310/201 |
| 6,208,058 | B1 * | 3/2001 | Taji et al. | 310/201 |
| 6,459,177 | B1 * | 10/2002 | Nakamura et al. | 310/216.136 |
| 6,710,501 | B1 | 3/2004 | Kusumoto et al. | |
| 6,915,556 | B2 * | 7/2005 | Lenoir et al. | 29/596 |
| 7,994,677 | B2 | 8/2011 | Kouda et al. | |
| 8,030,812 | B2 * | 10/2011 | Tanaka et al. | 310/71 |
| 8,093,778 | B2 * | 1/2012 | Schmid et al. | 310/201 |
| 8,225,484 | B2 * | 7/2012 | Utaka | 29/596 |
| 2002/0041129 | A1 | 4/2002 | Oohashi et al. | |
| 2005/0140239 | A1 * | 6/2005 | Klamt et al. | 310/201 |
| 2008/0191574 | A1 * | 8/2008 | Tokizawa | 310/179 |
| 2009/0146523 | A1 | 6/2009 | Kouda et al. | |
| 2009/0200888 | A1 | 8/2009 | Tanaka et al. | |
| 2011/0012450 | A1 | 1/2011 | Umeda et al. | |

FOREIGN PATENT DOCUMENTS

| | | |
|---|---|---|
| JP | 2001-145286 | 5/2001 |
| JP | 2002-119003 | 4/2002 |
| JP | 2009-131091 | 6/2009 |
| JP | 2009-219343 | 9/2009 |
| JP | 2011-182579 | 9/2011 |

OTHER PUBLICATIONS

Utaka, U.S. Appl. No. 13/076,966, filed Mar. 31, 2011.
Utaka, U.S. Appl. No. 13/076,986, filed Mar. 31, 2011.
Office Action (2 pages) dated Nov. 12, 2013, issued in corresponding Japanese Application No. 2010-082864 and English translation (2 pages).

* cited by examiner

*Primary Examiner* — Tran Nguyen
(74) *Attorney, Agent, or Firm* — Nixon & Vanderhye PC

(57) ABSTRACT

A stator for an electric rotating machine includes a hollow cylindrical stator core having a plurality of slots and a stator coil formed by joining a plurality of electric wires mounted on the stator core. For each joined pair of the electric wires, one of the electric wires has an end portion led out from the radially inner periphery of one of the slots of the stator core while the other electric wire has an end portion led out from the radially outer periphery of another one of the slots of the stator core; the end portions are welded together to form a weld therebetween. Part of the welds formed between the end portions of the joined pairs of the electric wires are located on the radially inner periphery of the stator coil while the remaining welds are located on the radially outer periphery of the stator coil.

7 Claims, 5 Drawing Sheets

STATOR FOR ELECTRIC ROTATING MACHINE

CROSS-REFERENCE TO RELATED APPLICATION

This application is based on and claims priority from Japanese Patent Application No. 2010-82864, filed on Mar. 31, 2010, the content of which is hereby incorporated by reference in its entirety into this application.

BACKGROUND

1 Technical Field

The present invention relates to stators for electric rotating machines that are used in, for example, motor vehicles as electric motors and electric generators.

2 Description of Related Art

Conventionally, there are known stators for electric rotating machines which include a hollow cylindrical stator core and a stator coil. The stator core has a plurality of slots that are formed in the radially inner surface of the stator core and spaced in the circumferential direction of the stator core. The stator coil is comprised of a plurality of electric wires mounted on the stator core.

Moreover, there is disclosed, for example in Japanese Patent Application Publication No. 2001-145286, a method of manufacturing a stator. According to the method, to improve the space factors of the electric wires in the slots of the stator core, each of the wires of the U-phase, V-phase, and W-phase windings of the stator coil is configured to have a rectangular cross section and have such an overall shape that when developed on a plane, the winding meanders in the form of cranks. Further, each of the U-phase, V-phase, and W-phase windings is wound by a predetermined number of turns into a spiral shape, so as to make the stator coil have a hollow cylindrical shape.

With the above method, however, each of the electric wires (or electric conductors) that respectively make up the U-phase, V-phase, and W-phase windings of the stator coil is required to have a long length. Accordingly, a large-scale shaping machine is needed for shaping the electric wires. Moreover, since each of the electric wires is long, it is difficult to handle the electric wires during the manufacture of the stator. As a result, it is difficult to secure a high productivity and a low cost of the stator.

To solve the above problems, the assignee of the present application (i.e., Denso Corporation) has developed a stator 20 as shown in FIG. 1. It should be noted that for the stator 20, the assignee of the present application has already applied for both a Japanese patent (application No. 2009-241798) and a U.S. patent (application Ser. No. 12/837,726).

The stator 20 includes a hollow cylindrical stator core 30 and a stator coil 40. The stator core 30 has, as shown in FIG. 2, a plurality of slots 31 that are formed in the radially inner surface of the stator core 30 and spaced in the circumferential direction of the stator core 30. The stator coil 40 is comprised of a plurality of electric wires mounted on the stator core 30.

Each of the electric wires has first, second, . . . , nth in-slot portions and first, second, . . . , (n−1)th turn portions, where n is an integer not less than 4. The first to the nth in-slot portions are sequentially received in p of the slots 31 of the stator core 30, where p is an integer not greater than n. The first to the (n−1)th turn portions are alternately located on opposite axial sides of the stator core 30 outside the slots 31 to connect corresponding adjacent pairs of the first to the nth in-slot portions. Each of the electric wires also has first and second end portions. The first end portion is closer to the first in-slot portion than any other of the in-slot portions of the electric wire; the second end portion is closer to the nth in-slot portion than any other of the in-slot portions of the electric wire. The first in-slot portions of the electric wires are located most radially outward and the nth in-slot portions are located most radially inward in the slots 31 of the stator core 30. Moreover, the stator coil 40 is a multi-phase (e.g., three-phase) stator coil that includes a plurality of phase windings. Each of the phase windings of the stator coil 40 is formed of at least two of the electric wires. The first end portion of one of the two electric wires is connected to the second end portion of the other electric wire.

With the above configuration, since each of the phase windings of the stator coil 40 is formed of the at least two electric wires, it is possible to shorten the length of each of the electric wires. Consequently, the electric wires can be shaped using a small-scale shaping machine and be easily handled during the manufacture of the stator 20. As a result, it is possible to achieve a high productivity and a low cost of the stator.

Moreover, in the stator 20, for each connected pair of the electric wires forming the stator coil 40, the first end portion of the one electric wire is connected to the second end portion of the other electric wire via an electrically-conductive crossover member 70. The crossover member 70 extends to cross over an annular coil end part 40A of the stator coil 40, which protrudes from an axial end face 30A of the stator core 30, from the radially inside to the radially outside of the coil end part 40A.

Furthermore, the crossover member 70 may be configured as an integral part of the second end portion of the other electric wire, as shown in FIG. 1. In this case, the first and second end portions of the pair of the electric wires are joined together by welding, forming a weld 70a therebetween.

However, with the above configuration, all the welds 70a between the first and second end portions of the connected pairs of the electric wires are located on the radially outer periphery of the stator coil 40 so as to be equally spaced in the circumferential direction of the stator core 30. Consequently, the spatial distances (or air clearances) d1 between the welds 70a become small, thereby making it difficult to ensure electrical insulation between the welds 70a.

SUMMARY

According to the invention, there is provided a stator for an electric rotating machine. The stator includes a hollow cylindrical stator core and a stator coil. The stator core has a plurality of slots that are formed in the radially inner surface of the stator core and spaced in the circumferential direction of the stator core. The stator coil is formed by joining a plurality of electric wires mounted on the stator core. For each joined pair of the electric wires, one of the electric wires has an end portion led out from the radially inner periphery of one of the slots of the stator core while the other electric wire has an end portion led out from the radially outer periphery of another one of the slots of the stator core; the end portions are welded together to form a weld therebetween. Part of the welds formed between the end portions of the joined pairs of the electric wires are located on the radially inner periphery of the stator coil while the remaining welds are located on the radially outer periphery of the stator coil.

Preferably, for each joined pair of the electric wires, one of the end portions of the pair of the electric wires is bent to extend toward the other end portion so as to cross over an annular coil end part of the stator coil; the coil end part is located outside the slots of the stator core so as to protrude from an axial end face of the stator core.

Each of those welds which are located on the radially inner periphery of the stator coil makes up a radially inner weld of the stator coil. Each of those welds which are located on the radially outer periphery of the stator coil makes up a radially outer weld of the stator coil. The radially inner welds of the stator coil may be alternately arranged with the radially outer welds of the stator coil in the circumferential direction of the stator core.

Otherwise, all the radially inner welds of the stator coil may be classified into a plurality of radially inner weld groups each of which includes circumferentially-adjacent two or more of the radially inner welds. All the radially outer welds of the stator coil may be classified into a plurality of radially outer weld groups each of which includes circumferentially-adjacent two or more of the radially outer welds. Further, the radially inner weld groups may be alternately arranged with the radially outer weld groups in the circumferential direction of the stator core.

In one embodiment of the invention, for each joined pair of the electric wires, the end portions of the pair of the electric wires have their respective side surfaces arranged to face each other in the axial direction of the stator core and welded together to form the weld between the end portions.

In another embodiment of the invention, for each joined pair of the electric wires, the end portions of the pair of the electric wires have their respective side surfaces arranged to face each other in the circumferential direction of the stator core and welded together to form the weld between the end portions.

In yet another embodiment of the invention, the stator coil is a multi-phase stator coil. For each circumferentially-adjacent pair of the welds which are of different phases, one of the pair of the welds is located on the radially inner periphery of the stator coil while the other is located on the radially outer periphery of the stator coil.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
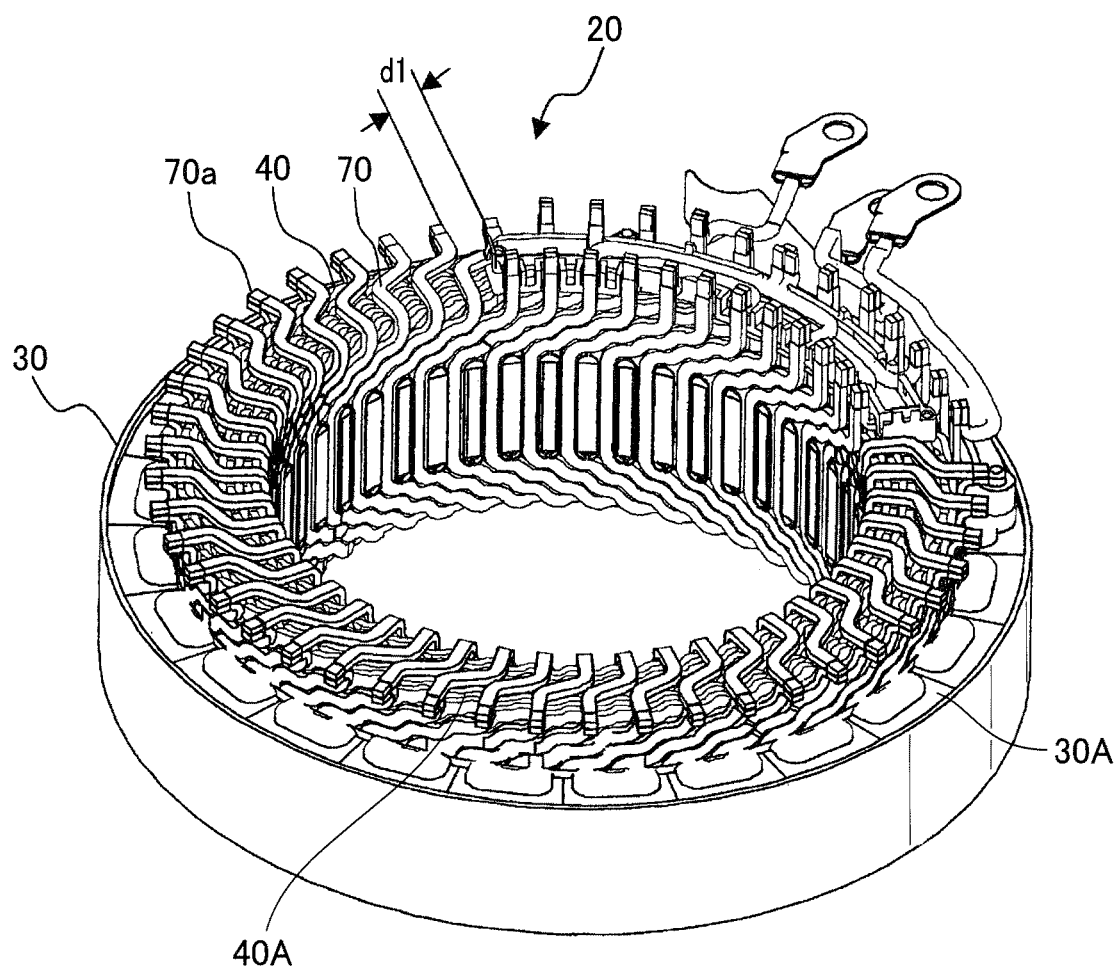
FIG. 1 is a perspective view of a stator for an electric rotating machine according to a related art.

Preferred embodiments of the present invention will be described hereinafter with reference to FIGS. 3-7. It should be noted that for the sake of clarity and understanding, identical components having identical functions in different embodiments of the invention have been marked, where possible, with the same reference numerals in each of the figures and that for the sake of avoiding redundancy, descriptions of the identical components will not be repeated.

[First Embodiment]

Figure 3:
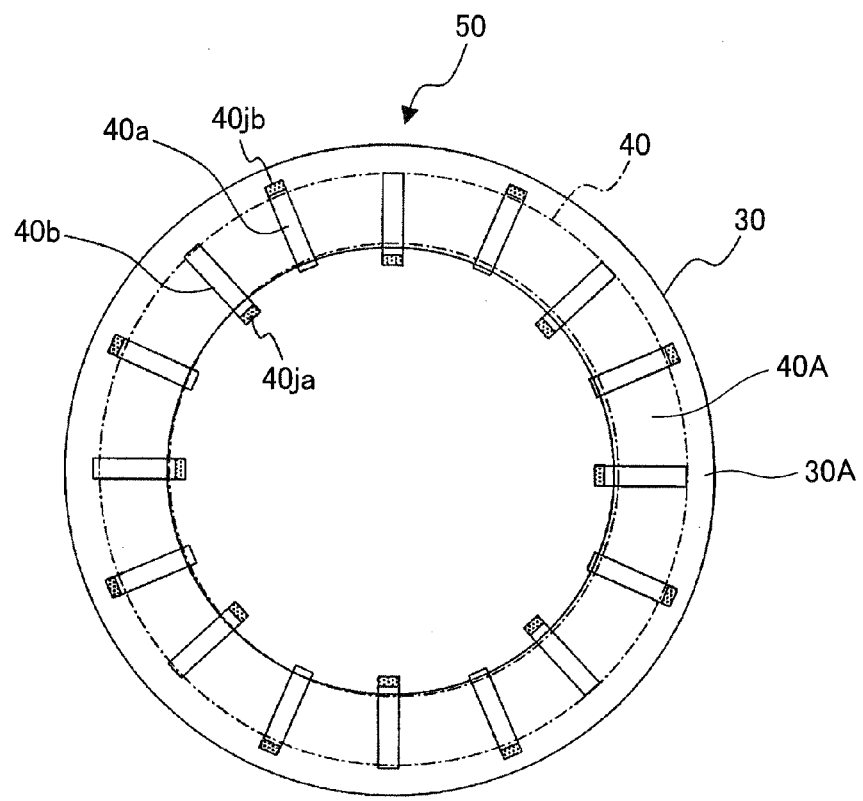
FIG. 3 is an axial end view of a stator for an electric rotating machine according to the first embodiment of the invention.

FIG. 3 shows the overall configuration of a stator 50 according to the first embodiment of the invention. The stator 50 is designed for use in, for example, an electric rotating machine that is configured to function both as an electric motor and as an electric generator in a motor vehicle.

As shown in FIG. 3, the stator 50 includes a hollow cylindrical stator core 30 and a stator coil 40.

Figure 2:
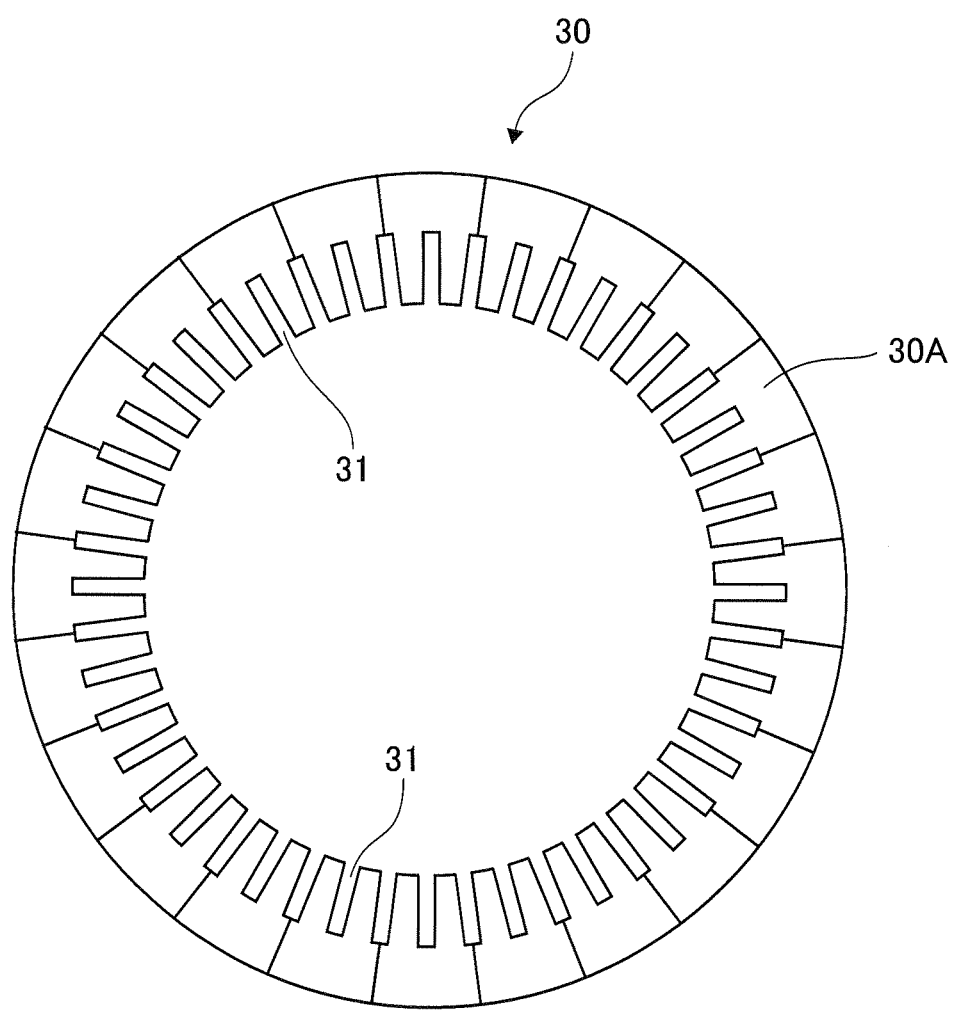
FIG. 2 is an axial end view of a stator core.

The stator core 30 is configured as shown in FIG. 2. Specifically, the stator core 30 has a plurality of slots 31 that are formed in the radially inner surface of the stator core 30 and spaced in the circumferential direction of the stator core 30.

The stator coil 40 is comprised of a plurality of electric wires mounted on the stator core 30. Each of the electric wires has a substantially rectangular cross section.

Further, the stator coil 40 is configured as a three-phase stator coil that includes U-phase, V-phase and W-phase windings. Each of the U-phase, V-phase and W-phase windings is formed by joining at least two of the electric wires.

Figure 4:
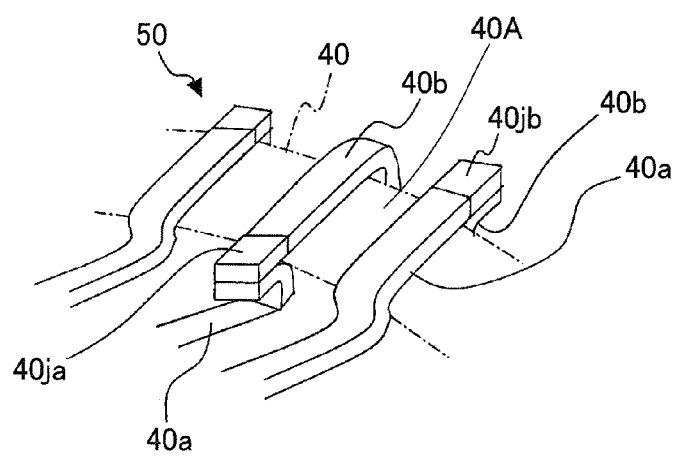
FIG. 4 is an enlarged perspective view showing part of the stator according to the first embodiment.

For each joined pair of the electric wires, one of the electric wires has an end portion 40$a$ led out from the radially inner periphery of one slot 31 of the stator core 30 while the other electric wire has an end portion 40$b$ led out from the radially outer periphery of another slot 31 of the stator core 30. Moreover, one of the end portions 40$a$ and 40$b$ is bent to extend toward the other so as to cross over an annular coil end part 40A of the stator coil 40; the coil end part 40A is located outside the slots 31 of the stator core 30 so as to protrude from an axial end face 30A of the stator core 30. Further, the end portions 40$a$ and 40$b$ are welded together, forming a weld 40$j$ therebetween. More specifically, as shown in FIGS. 3 and 4, the end portions 40$a$ and 40$b$ have their respective side surfaces arranged to face each other in the axial direction of the stator core 30 and welded together to form the weld 40$j$.

In the present embodiment, all the welds 40$j$ formed between the joined pairs of the electric wires are classified into radially inner welds 40$ja$ and radially outer welds 40$jb$. The radially inner welds 40$ja$ are located on the radially inner periphery of the stator coil 40 (or radially inside the coil end part 40A of the stator coil 40), while the radially outer welds 40$jb$ are located on the radially outer periphery of the stator coil 40 (or radially outside the coil end part 40A). Moreover, the radially inner welds 40$ja$ are alternately arranged with the radially outer welds 40$jb$ in the circumferential direction of the stator core 30.

With the above arrangement, it is possible to secure both sufficiently long spatial and creepage distances between each circumferentially-adjacent pair of the welds 40$j$ between the electric wires forming the stator coil 40. Consequently, it is possible to ensure electrical insulation between the welds 40$j$, thereby ensuring high reliability of the stator 50.

Moreover, in the present embodiment, as described above, for each joined pair of the electric wires, one of the end portions 40$a$ and 40$b$ of the pair of the electric wires is bent to extend toward the other so as to cross over the annular coil end part 40A of the stator coil 40.

With the above configuration, all the welds 40$j$ formed between the end portions 40$a$ and 40$b$ of the electric wires are located to protrude from the coil end part 40A radially inward or radially outward. Consequently, it is possible to easily perform the process of welding the end portions 40a and 40b without causing the stator coil 40 to be damaged by the heat of the welding sparks.

Furthermore, in the present embodiment, as described above, for each joined pair of the electric wires, the end portions 40a and 40b of the pair of the electric wires have their respective side surfaces arranged to face each other in the axial direction of the stator core 30 and welded together to form the weld 40j between the end portions 40a and 40b.

With the above arrangement, it is possible to minimize the width of each of the welds 40j between the end portions 40a and 40b of the electric wires in the circumferential direction of the stator core 30.

[Second Embodiment]

Figure 5:
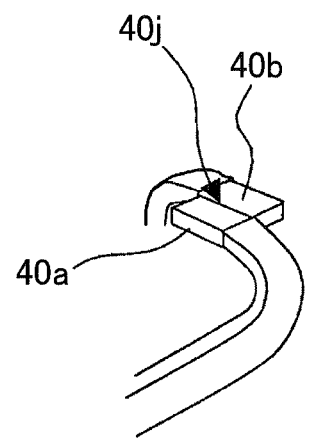
FIG. 5 is an enlarged perspective view showing part of a stator for an electric rotating machine according to the second embodiment of the invention.

Referring to FIG. 5, in this embodiment, for each joined pair of the electric wires, the end portions 40a and 40b of the pair of the electric wires have their respective side surfaces arranged to face each other in the circumferential direction of the stator core 30 and welded together to form the weld 40j between the end portions 40a and 40b.

With the above configuration, it is possible to minimize the thickness of each of the welds 40j between the end portions 40a and 40b of the electric wires in the axial direction of the stator core 30.

[Third Embodiment]

Figure 6:
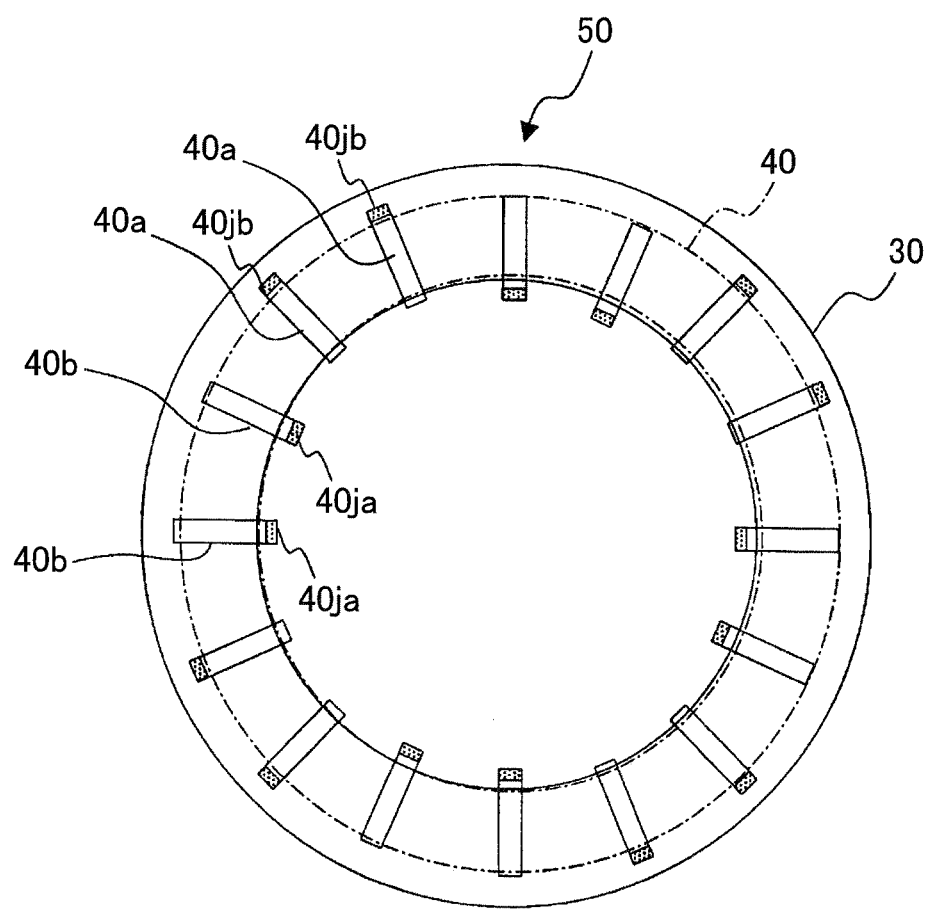
FIG. 6 is an axial end view of a stator for an electric rotating machine according to the third embodiment of the invention.

Referring to FIG. 6, in this embodiment, all the radially inner welds 40ja are classified into a plurality of radially inner weld pairs each of which includes two circumferentially-adjacent radially inner welds 40ja of the same phase. On the other hand, all the radially outer welds 40jb are classified into a plurality of radially outer weld pairs each of which includes two circumferentially-adjacent radially outer welds 40jb of the same phase. Moreover, the radially inner weld pairs are alternately arranged with the radially outer weld pairs in the circumferential direction of the stator core 30.

In the three-phase stator coil 40, the electric potential difference between two circumferentially-adjacent welds 40j which are of different phases is greater than that between two circumferentially-adjacent welds 40j which are of the same phase.

However, with the above arrangement of the welds 40j according to the present embodiment, it is possible to secure both sufficiently long spatial and creepage distances between each circumferentially-adjacent pair of the welds 40j which are of different phases. Consequently, it is possible to ensure electric insulation between the welds 40j, thereby ensuring high reliability of the stator 50.

[Fourth Embodiment]

Figure 7:
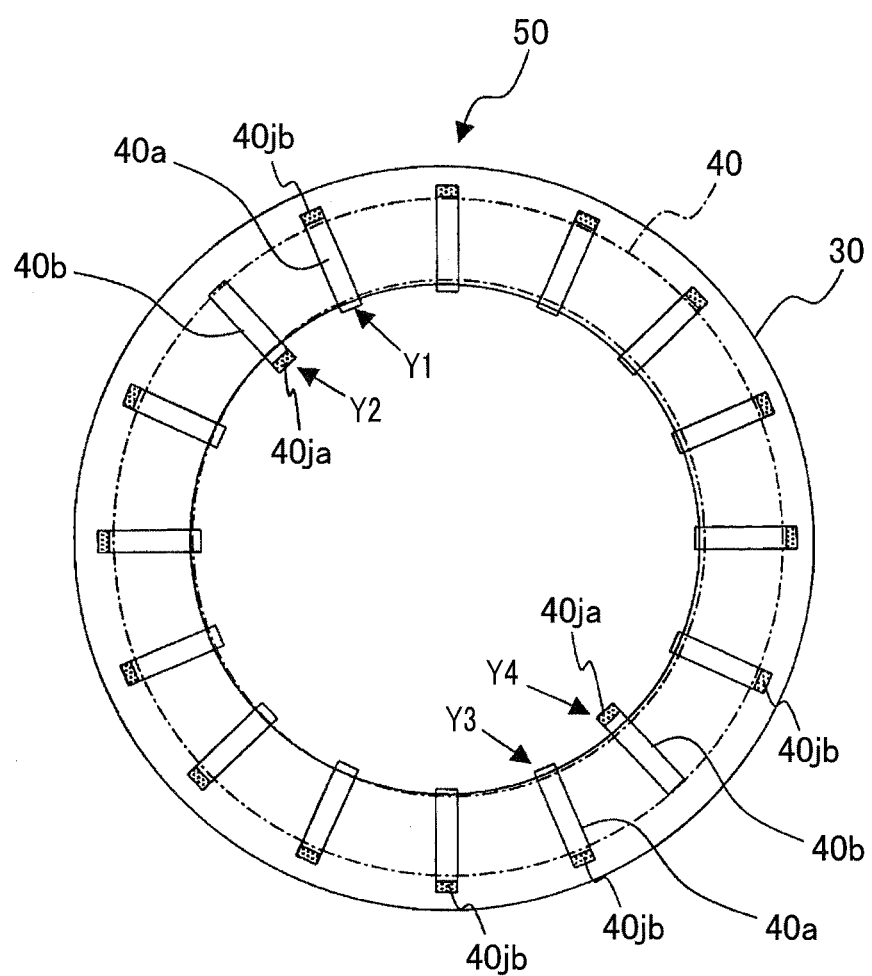
FIG. 7 is an axial end view of a stator for an electric rotating machine according to the fourth embodiment of the invention.

Referring to FIG. 7, in this embodiment, for each circumferentially-adjacent pair of the welds 40j which are of different phases (e.g., the pair designated by Y1 and Y2 and the pair designated by Y3 and Y4), one of the pair of the welds 40j is located on the radially inner periphery of the stator coil 40 to make up a radially inner weld 40a while the other is located on the radially outer periphery of the stator coil 40 to make up a radially outer weld 40b.

With the above arrangement, it is possible to secure both sufficiently long spatial and creepage distances between each circumferentially-adjacent pair of the welds 40j which are of different phases. Consequently, it is possible to ensure electric insulation between the welds 40j, thereby ensuring high reliability of the stator 50.

While the above particular embodiments of the present invention have been shown and described, it will be understood by those skilled in the art that various modifications, changes, and improvements may be made without departing from the spirit of the invention.

For example, in the first embodiment, the radially inner welds 40ja are alternately arranged with the radially outer welds 40jb in the circumferential direction of the stator core 30, as shown in FIG. 3. Moreover, in the third embodiment, the radially inner weld pairs are alternately arranged with the radially outer weld pairs in the circumferential direction of the stator core 30, as shown in FIG. 6.

However, it is also possible to arrange the welds 40j such that: all the radially inner welds 40ja are classified into a plurality of radially inner weld groups each of which includes more than two circumferentially-adjacent radially inner welds 40ja that are of the same phase; all the radially outer welds 40jb are classified into a plurality of radially outer weld groups each of which includes more than two circumferentially-adjacent radially outer welds 40jb that are of the same phase; and the radially inner weld groups are alternately arranged with the radially outer weld groups in the circumferential direction of the stator core 30.

What is claimed is:

1. A stator for an electric rotating machine, the stator comprising:
   a hollow cylindrical stator core having a plurality of slots that are formed in a radially inner surface of the stator core and spaced in a circumferential direction of the stator core; and
   a stator coil that is formed by joining a plurality of electric wires mounted on the stator core,
   wherein
   for each joined pair of the electric wires, one of the electric wires has an end portion led out from a radially inner periphery of one of the slots of the stator core while the other electric wire has an end portion led out from a radially outer periphery of another one of the slots of the stator core, the end portions being welded together to form a weld therebetween, and
   a predetermined number of the welds formed between the end portions of the joined pairs of the electric wires are located on a radially inner periphery of the stator coil while a remaining number of welds are located on a radially outer periphery of the stator coil.

2. The stator as set forth in claim 1, wherein for each joined pair of the electric wires:
   one of the end portions of the pair of the electric wires is bent to extend toward the other end portion so that the one end portion crosses over an annular coil end part of the stator coil, and
   the coil end part being located outside the slots of the stator core so that the coil end part protrudes from an axial end face of the stator core.

3. The stator as set forth in claim 1, wherein:
   said predetermined number of the welds that are located on the radially inner periphery of the stator coil makes up a radially inner weld of the stator coil,
   said remaining number of welds that are located on the radially outer periphery of the stator coil makes up a radially outer weld of the stator coil, and
   the radially inner welds of the stator coil are alternately arranged with the radially outer welds of the stator coil in the circumferential direction of the stator core.

4. The stator as set forth in claim 1, wherein:
   said predetermined number of the welds that are located on the radially inner periphery of the stator coil makes up a radially inner weld of the stator coil,
   said remaining number of welds that are located on the radially outer periphery of the stator coil makes up a radially outer weld of the stator coil, all the radially inner welds of the stator coil are classified into a plurality of radially inner weld groups each of which includes circumferentially-adjacent two or more of the radially inner welds, all the radially outer welds of the stator coil are classified into a plurality of radially outer weld groups each of which includes circumferentially-adjacent two or more of the radially outer welds, and the radially inner weld groups are alternately arranged with the radially outer weld groups in the circumferential direction of the stator core.

5. The stator as set forth in claim 1, wherein for each joined pair of the electric wires, the end portions of the pair of the electric wires have their respective side surfaces arranged to face each other in an axial direction of the stator core and welded together to form the weld between the end portions.

6. The stator as set forth in claim 1, wherein for each joined pair of the electric wires, the end portions of the pair of the electric wires have their respective side surfaces arranged to face each other in the circumferential direction of the stator core and welded together to form the weld between the end portions.

7. The stator as set forth in claim 1, wherein the stator coil is a multi-phase stator coil, and for each circumferentially-adjacent pair of the welds of different phases, one of the pair of the welds is located on the radially inner periphery of the stator coil while the other is located on the radially outer periphery of the stator coil.

* * * * *